United States Patent
Han et al.

(10) Patent No.: US 10,676,581 B2
(45) Date of Patent: Jun. 9, 2020

(54) PROCESSING AIDS FOR USE IN MANUFACTURE EXTRUDED POLYSTYRENE FOAMS USING LOW GLOBAL WARMING POTENTIAL BLOWING AGENTS

(71) Applicant: Owens Corning Intellectual Capital, LLC, Toledo, OH (US)

(72) Inventors: Xiangmin Han, Stow, OH (US); Raymond Marshall Breindel, Hartville, OH (US); S. Thomas Brammer, Kent, OH (US); Yadollah Delaviz, Lewis Center, OH (US); Chase J. Boudreaux, Canton, OH (US); Barbara Fabian, Medina, OH (US); Nikoi Annan, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 159 days.

(21) Appl. No.: 15/724,835

(22) Filed: Oct. 4, 2017

(65) Prior Publication Data
US 2018/0022883 A1   Jan. 25, 2018

Related U.S. Application Data

(63) Continuation of application No. 14/210,970, filed on Mar. 14, 2014, now abandoned.
(Continued)

(51) Int. Cl.
*C08J 9/00* (2006.01)
*B29C 48/00* (2019.01)
(Continued)

(52) U.S. Cl.
CPC .......... *C08J 9/0009* (2013.01); *B29C 48/022* (2019.02); *C08J 9/009* (2013.01); *C08J 9/08* (2013.01);
(Continued)

(58) Field of Classification Search
CPC ....................................................... C08J 9/0009
See application file for complete search history.

(56) References Cited

U.S. PATENT DOCUMENTS 4,229,396 A     10/1980  Suh et al.
4,500,359 A  *   2/1985  Woods ................ A61K 8/06
                                                106/270

(Continued)

FOREIGN PATENT DOCUMENTS

EP        2706086 A1      3/2014
WO     2007149893        12/2007
(Continued)

OTHER PUBLICATIONS

"Didecyl adipate" by Scifinder (Year: 2017).*
(Continued)

*Primary Examiner* — Randy P Gulakowksi
*Assistant Examiner* — Christina H. W. Rosebach
(74) *Attorney, Agent, or Firm* — Calfee, Halter & Griswold LLP

(57) ABSTRACT

A foamable polymeric mixture is provided that includes a polymer composition and at least one blowing agent. The blowing agent may comprise any blowing agents known not to deplete the ozone or increase the prevalence of global warming, such as $CO_2$, HFO, HFC and mixtures thereof. The foamable polymeric mixture may further includes at least one processing aid comprising an organic phase chang-
(Continued)

ing material. The inventive foamable mixture is capable of processing at a pressure range of 800 to 1200 psi (5.5 to 8.3 MPa).

7 Claims, 5 Drawing Sheets

Related U.S. Application Data

(60) Provisional application No. 61/786,965, filed on Mar. 15, 2013.

(51) Int. Cl.
*C08J 9/08* (2006.01)
*C08J 9/14* (2006.01)
*C08J 9/12* (2006.01)
*B29C 48/285* (2019.01)
*B29K 105/04* (2006.01)
*B29K 25/00* (2006.01)

(52) U.S. Cl.
CPC .............. *C08J 9/122* (2013.01); *C08J 9/146* (2013.01); *B29C 48/297* (2019.02); *B29K 2025/06* (2013.01); *B29K 2105/04* (2013.01); *B29K 2105/048* (2013.01); *C08J 2201/03* (2013.01); *C08J 2203/02* (2013.01); *C08J 2203/06* (2013.01); *C08J 2203/142* (2013.01); *C08J 2203/162* (2013.01); *C08J 2205/044* (2013.01); *C08J 2205/046* (2013.01); *C08J 2205/052* (2013.01); *C08J 2205/10* (2013.01); *C08J 2325/06* (2013.01)

(56) References Cited

U.S. PATENT DOCUMENTS

| | | | |
|---|---|---|---|
| 4,873,218 | A | 10/1989 | Pekala |
| 5,276,092 | A | 1/1994 | Kempner et al. |
| 5,456,852 | A * | 10/1995 | Isiguro ............... B01J 13/02 165/10 |
| 5,576,094 | A | 11/1996 | Callens et al. |
| 5,656,344 | A | 8/1997 | Sawa et al. |
| 5,776,389 | A | 7/1998 | Chaudhary |
| 6,632,382 | B1 | 10/2003 | Miller et al. |
| 7,605,188 | B2 | 10/2009 | Loh et al. |
| 7,629,306 | B2 | 12/2009 | Shankland et al. |
| 8,119,701 | B2 | 2/2012 | Delaviz et al. |
| 8,198,340 | B2 | 6/2012 | Vo et al. |
| 8,349,909 | B2 | 1/2013 | Delaviz et al. |
| 8,420,706 | B2 | 4/2013 | Bowman et al. |
| 8,558,040 | B2 | 10/2013 | Creazzo et al. |
| 8,648,123 | B2 | 2/2014 | Van Horn et al. |
| 8,754,142 | B2 | 6/2014 | Delaviz et al. |
| 8,772,364 | B2 | 7/2014 | Van Horn et al. |
| 8,895,635 | B2 | 11/2014 | Van Horn et al. |
| 9,005,745 | B2 | 4/2015 | Annan et al. |
| 9,206,297 | B2 | 12/2015 | Van Horn et al. |
| 9,359,481 | B2 | 6/2016 | Breindel et al. |
| 2003/0226628 | A1 | 12/2003 | Bailey |
| 2004/0026659 | A1 | 2/2004 | Lin |
| 2004/0256594 | A1 | 12/2004 | Singh et al. |
| 2006/0148916 | A1 | 7/2006 | Loh et al. |
| 2007/0010592 | A1 | 1/2007 | Bowman |
| 2007/0090552 | A1 * | 4/2007 | Delaviz ............... C08J 9/0023 264/45.9 |
| 2007/0173554 | A1 | 7/2007 | Delaviz et al. |
| 2007/0299152 | A1 | 12/2007 | Bharat et al. |
| 2008/0242752 | A1 | 10/2008 | Delaviz et al. |
| 2008/0287560 | A1 | 11/2008 | Loh et al. |
| 2009/0099299 | A1 * | 4/2009 | Gallucci ............... C08L 79/08 524/538 |
| 2009/0181207 | A1 | 7/2009 | Michalik et al. |
| 2010/0016457 | A1 | 1/2010 | Bowman et al. |
| 2010/0056657 | A1 | 3/2010 | Chen et al. |
| 2010/0087115 | A1 | 4/2010 | Davis et al. |
| 2010/0105789 | A1 | 4/2010 | Van Horn et al. |
| 2010/0112328 | A1 | 5/2010 | Van Horn et al. |
| 2010/0113629 | A1 | 5/2010 | Van Hom et al. |
| 2010/0144216 | A1 | 6/2010 | Daniel et al. |
| 2010/0175810 | A1 | 7/2010 | Korwin-Edson et al. |
| 2010/0181524 | A1 | 7/2010 | Elsheikh et al. |
| 2010/0331433 | A1 | 12/2010 | Annan et al. |
| 2011/0039964 | A1 | 2/2011 | Williams et al. |
| 2011/0064938 | A1 * | 3/2011 | Breindel ............... B82Y 30/00 428/315.5 |
| 2011/0144221 | A1 | 6/2011 | Delaviz et al. |
| 2011/0201662 | A1 | 8/2011 | Ishaque et al. |
| 2011/0288192 | A1 | 11/2011 | Van Horn |
| 2012/0208911 | A1 | 8/2012 | Wang et al. |
| 2012/0208913 | A1 | 8/2012 | Wang et al. |
| 2012/0225961 | A1 | 9/2012 | Van Horn et al. |
| 2013/0018177 | A1 | 1/2013 | Hamilton |
| 2013/0040122 | A1 | 2/2013 | Annan et al. |
| 2013/0040526 | A1 | 2/2013 | Hartmann et al. |
| 2013/0203878 | A1 | 8/2013 | Igualada et al. |
| 2013/0225704 | A1 | 8/2013 | Delaviz et al. |
| 2013/0245142 | A1 | 9/2013 | Okuda et al. |
| 2014/0316020 | A1 | 10/2014 | Han et al. |
| 2016/0319093 | A1 | 11/2016 | Breindel et al. |

FOREIGN PATENT DOCUMENTS

| | | |
|---|---|---|
| WO | 2009148445 | 12/2009 |
| WO | 2010009090 | 1/2010 |
| WO | 2010101747 | 9/2010 |
| WO | 2010111106 | 9/2010 |
| WO | 2011084277 | 7/2011 |
| WO | 2012109505 | 8/2012 |
| WO | 2012109508 | 8/2012 |
| WO | 2014015315 | 1/2014 |
| WO | 2014152410 | 9/2014 |

OTHER PUBLICATIONS

Drogin, "The Role of Carbon Black as a Colorant," Color Engineering, vol. 5, No. 4, Jul.-Aug. 1967, pp. 20-31.
Definition of "hydrofluorocarbon," Definedterm.com, 2018.
Definition of "hydrofluoroolefin," Definedterm.com, 2018.
International Search Report and Written Opinion from PCT/US14/27312 dated Jul. 17, 2014.
Communication from European Application No. 14770165.0 dated Aug. 30, 2016.
Search Report from European Application No. 14770165.0 dated Dec. 1, 2016.
Office Action from European Application No. 14770165.0 dated Jul. 6, 2017.
Office Action from European Application No. 14770165.0 dated Dec. 4, 2017.
Office Action from Chinese Application No. 201480022794.X dated Sep. 26, 2016.
Office Action from Chinese Application No. 201480022794.X dated May 4, 2017.
Office Action from Chinese Application No. 201480022794.X dated Oct. 11, 2017.
Office Action from U.S. Appl. No. 14/210,970 dated Oct. 2, 2015.
Office Action from U.S. Appl. No. 14/210,970 dated May 5, 2016.
Office Action from U.S. Appl. No. 14/210,970 dated Sep. 22, 2016.
Office Action from U.S. Appl. No. 14/210,970 dated Mar. 8, 2017.
Office Action from U.S. Appl. No. 14/210,970 dated Jul. 7, 2017.
"Didecyl adipate" by Scifinder 2017.
"Honeywell Sells Novel Low-Global-Warming Blowing Agent to European Customers" by Honeywell, published Oct. 7 2008, accessed at http://http://www51.honeywell.com/honeywell/news-events/press-releases-details/10.07.08GlobalWarming.html?c=31.
Lutton, E.S., "The Polymorphism of Tristearin and Some of its Homolgs," vol. 67, pp. 524-527, dated Apr. 1, 1945, Journal of the American Chemical Society.

(56) References Cited

OTHER PUBLICATIONS

Rauwendaal, C., "Extrusion," Encyclopedia of Polymer Science and Technology, vol. 2, 2001.
Office Action from Indian Application No. 3095/KOLNP/2015 dated Apr. 30, 2019.
Extended European Search Report from European Application No. 19150072.7 dated Apr. 1, 2019.
Stevens, "Polymer Additives," Journal of Chemical Education, vol. 70, No. 6, 1993, p. 444-448.

\* cited by examiner

PROCESSING AIDS FOR USE IN MANUFACTURE EXTRUDED POLYSTYRENE FOAMS USING LOW GLOBAL WARMING POTENTIAL BLOWING AGENTS

RELATED APPLICATIONS

This application is a continuation of and claims priority from U.S. non-provisional application Ser. No. 14/210,970 filed on Mar. 14, 2014, titled "Processing Aids for Use in Manufacturing Extruded Polystyrene Foams Using Low Global Warming Potential Blowing Agents," which claims the benefit of provisional application No. 61/786,965 filed on Mar. 15, 2013, titled "Processing Aids for Use in Manufacturing Extruded Polystyrene Foams Using Low Global Warming Potential Blowing Agents." Both of these applications are incorporated herein by reference in their entirety.

FIELD OF THE INVENTION

This invention relates to processes for forming polymeric foams and particularly to the manufacture of extruded polystyrene (XPS) foams in the absence of blowing agents that are known to deplete the ozone and increase the prevalence of global warming. This invention provides the use of a novel processing aid to stabilize the XPS foaming extrusion process and increase the operating window of XPS foam manufacturing.

BACKGROUND

The general procedure utilized in the preparation of extruded synthetic foam bodies generally includes the steps of melting a base polymeric composition, incorporating one or more blowing agents and other additives into the polymeric melt under conditions that provide for the thorough mixing of the blowing agent and the polymer while preventing the mixture from foaming prematurely, e.g., under pressure. This mixture is then typically extruded through a single or multi-stage extrusion die to cool and reduce the pressure on the mixture, allowing the mixture to foam and produce a foamed product. As will be appreciated, the relative quantities of the polymer(s), blowing agent(s) and additives, the temperature and the manner in which the pressure is reduced will tend to affect the qualities and properties of the resulting foam product. As will also be appreciated, the foamable mixture is maintained under a relatively high pressure until it passes through an extrusion die and is allowed to expand in a region of reduced pressure. Although reduced relative to the pressure at the extrusion die, the reduced pressure region may actually be maintained at a pressure above atmospheric pressure, for example up to about 2 atm or even more in some applications, may be maintained at a pressure below atmospheric pressure, for example down to about 0.25 atm or even less in some applications. Further, unless indicated otherwise, all references to pressure provided herein are stated as the absolute pressure.

The solubility of conventional blowing agents, such as chlorofluorocarbons ("CFCs") and certain alkanes, in polystyrene tends to reduce the extrusion melt viscosity and improve cooling of expanded polystyrene melts. For example, the combination of pentane and a CFCs such as Freon 11 and 12 is partially soluble in polystyrene and has been used for generating polystyrene foams that exhibited a generally acceptable appearance and physical properties such as surface finish, cell size and distribution, orientation, shrinkage and stiffness.

However, in response to the apparent contribution of such CFC compounds to the reduction of the ozone layer in Earth's stratosphere, the widespread use and accompanying atmospheric release of such compounds in applications such as aerosol propellants, refrigerants, foam-blowing agents and specialty solvents has recently been drastically reduced or eliminated by government regulation.

The divergence away from the use of CFCs has led to utilization of alternative blowing agents, such as hydrogen-containing chlorofluoroalkanes (HCFCs). However, while HCFC's are considered to be environmentally friendly blowing agents compared to CFCs, such compounds do still contain some chlorine and are therefore said to have an ozone depletion potential.

Another alternative class of blowing agents, hydrofluorocarbons (HFC's), are now being commonly used as more ozone friendly options. Particularly, $CF_3CH_2CF_2H$ (HFC-245fa), 1,1,1,2-tetrafluoroethane (HFC-134a) and 1,1-difluoroethane (HFC-152a), offer desirable improvements, such as improved insulation, due at least in part to the low thermal conductivity of the vapor.

Hydrocarbons such as pentane, hexane, cyclopentane and other homologs of this series have also been considered.

A new generation of fluroralkene blowing agents have been developed with low ODP (ozone depletion potential) and low GWP (global warming potential) known as hydroflouroolefins (HFOs). HFOs have been identified as potential low global warming potential blowing agents for the production of thermoplastic foams, such as polystyrene foam, for thermal insulation.

BRIEF SUMMARY

The general inventive concepts are directed to a foamable polymeric mixture. The foamable polymeric mixture comprises a polymer composition, such as a polystyrenic composition and at least one blowing agent. The blowing agent may comprise any blowing agents known not to deplete the ozone or increase the prevalence of global warming. Such blowing agents may consist of, for example, carbon dioxide, hydrofluoroolefins, and hydrofluorocarbons, along with mixtures thereof. The foamable polymeric mixture may further includes at least one processing aid comprising an organic phase changing material. The inventive foamable mixture is capable of processing at a pressure range of 800 to 1200 psi (5.5 to 8.3 MPa).

The general incentive concepts further relate to a method of manufacturing extruded polymeric foam. The method includes introducing a polymeric composition into a screw extruder to form a polymer melt and injecting at least one organic phase changing processing aid and at least one blowing agent into the polymer melt to form an foamable polymeric material. The blowing agent preferably comprises one or more low ozone depletion and low global warming potential compounds, such as carbon dioxide, hydrofluorocarbon, hydrofluoroolefin, and mixtures thereof. The method further includes extruding the foamable polymeric composition through a die under a processing temperature between 800 and 1200 psi (5.5 to 8.3 MPa) to produce a polymeric foam.

Further inventive concepts relate to an extruded polymeric foam. The extruded polymeric foam is formed from a foamable polymer material that includes a polymeric composition, at least one blowing agent, and an organic phase changing processing aid. The blowing agent may include one or more of carbon dioxide, hydrofluoroolefin, hydrofluorocarbon, and mixtures thereof. The processing aid may comprise an organic phase changing material. It is an object of the present invention that wherein said foam has an R-value between 4 and 7 per inch.

Additional inventive aspects relate to a foamable polymeric mixture that includes a polymer composition, at least one blowing agent, and at least one processing aid. The blowing agent comprising at least one of carbon dioxide, hydrofluoroolefins, and hydrofluorocarbons, and mixtures thereof. The processing aid may include an organic phase changing material. The foamable polymeric mixture is capable of forming an extruded polymeric foam having the following properties: an R-value between 4 and 7 per inch, an average cell size between 0.005 and 0.6 mm, a compressive strength between 6 and 80 psi, a density between 1.3-4 pcf; and an open cell content of less than 30 percent.

The foregoing and other objects, features, and advantages of the general inventive concepts will become more readily apparent from a consideration of the detailed description that follows.

DESCRIPTION OF THE DRAWINGS

Exemplary embodiments of the invention will be apparent from the more particular description of certain example embodiments of the invention provided below and as illustrated in the accompanying drawings.

DETAILED DESCRIPTION

Figure 1:
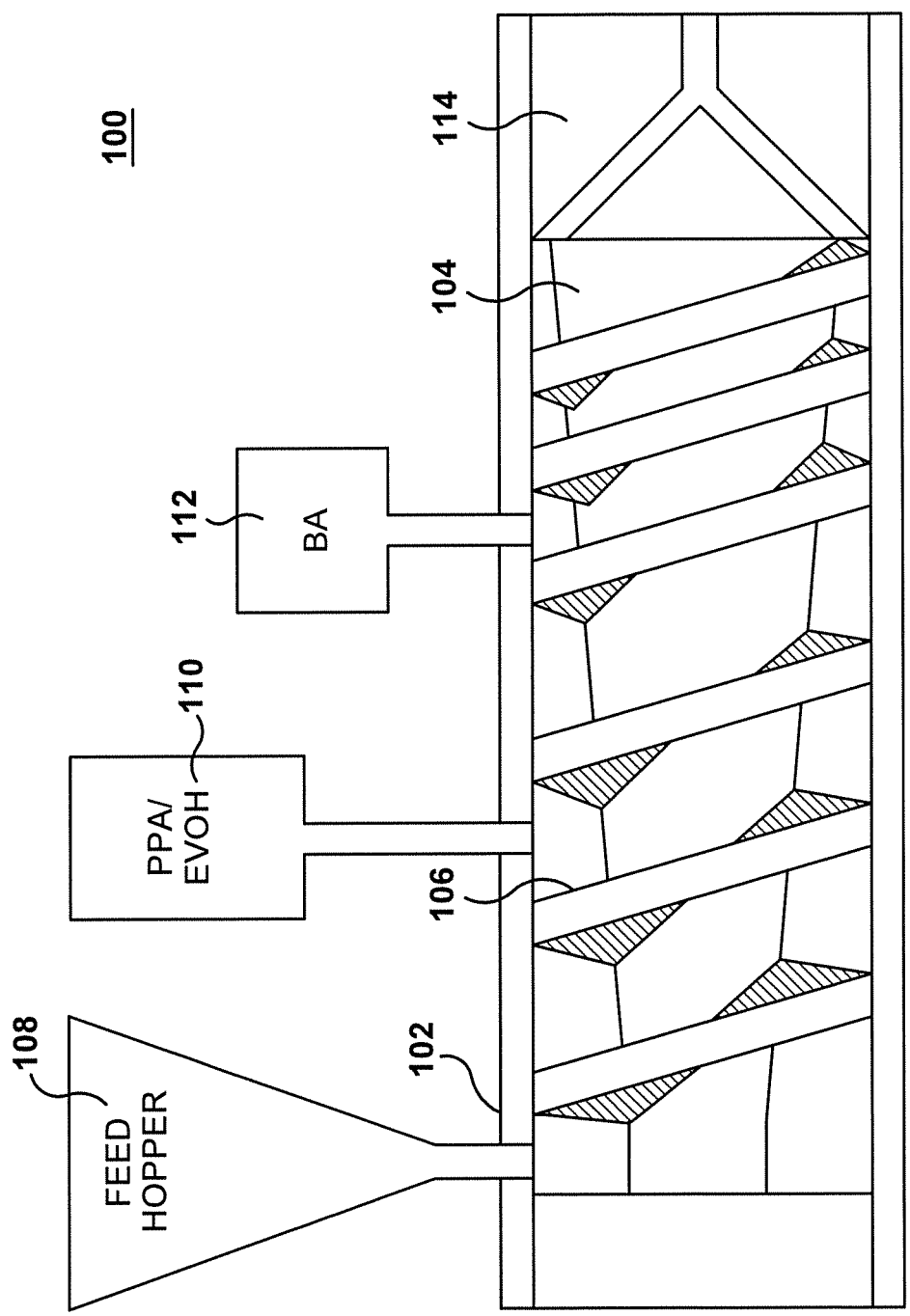
FIG. 1 is a schematic drawing of an exemplary extrusion apparatus useful for practicing methods according to the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements. The terms "composition" and "inventive composition" may be used interchangeably herein.

As used herein, the term "blowing agent" is understood to include physical (e.g., dissolved gaseous agents) or chemical blowing agents (e.g., a gas generated by decomposition). A blowing agent is generally added to a molten polymer, e.g., in an extruder, and under the proper conditions, to initiate foaming to produce a foamed thermoplastic. The blowing agent expands the resin and forms cells (e.g., open or closed pores). As the resin hardens or cures a foam is produced with either the blowing agent trapped in the cells or ambient air displaces the blowing agent in the cells. The blowing agents discussed herein are preferred to be environmentally acceptable blowing agents (e.g., they are generally safe for the environment) as would be recognized by one of ordinary skill in the art.

As used herein, unless specified otherwise, the values of the constituents or components of the blowing agent or other compositions are expressed in weight percent or % by weight of each ingredient in the composition. The values provided include up to and including the endpoints given.

The present invention relates to a polymeric foam and polymeric foam products, such as extruded or expanded polystyrene foams, formed from a composition that contains a foamable polymer material, at least one blowing agent (for example, hydrofluorocarbons (HFCs). hydrofluoroolefins (HFOs), and/or carbon dioxide ($CO_2$)), and a processing aid. The present invention further relates to a method for manufacturing such a polymeric foam or foam product. In some exemplary embodiments, the processing aid makes it possible to employ blowing agents, such as $CO_2$, HFO and HFC, which have low global warming potential and low ozone depletion potential, to make polymeric, closed cell foam under traditional processing conditions.

FIG. 1 illustrates a traditional extrusion apparatus 100 useful for practicing methods according to the present invention. The extrusion apparatus 100 may comprise a single or double (not shown) screw extruder including a barrel 102 surrounding a screw 104 on which a spiral flight 106 is provided, configured to compress, and thereby, heat material introduced into the screw extruder. As illustrated in FIG. 1, the polymeric composition may be feed into the screw extruder as a flowable solid, such as beads, granules or pellets, or as a liquid or semi-liquid melt, from one or more (not shown) feed hoppers 108.

The foamable polymer composition is the backbone of the formulation and provides strength, flexibility, toughness, and durability to the final product. The foamable polymer composition is not particularly limited, and generally, any polymer capable of being foamed may be used as the foamable polymer in the resin mixture. The foamable polymer composition may be thermoplastic or thermoset. The particular polymer composition may be selected to provide sufficient mechanical strength and/or to the process utilized to form final foamed polymer products. In addition, the foamable polymer composition is preferably chemically stable, that is, generally non-reactive, within the expected temperature range during formation and subsequent use in a polymeric foam. Non-limiting examples of suitable foamable polymer compositions include at least one of the following materials: alkenyl aromatic polymers, polyvinyl chloride (PVC), chlorinated polyvinyl chloride (CPVC), polyethylene, polypropylene, polycarbonates, polyisocyanurates, polyetherimides, polyamides, polyesters, polycarbonates, polymethylmethacrylate, polyurethanes, phenolics, polyolefins, styreneacrylonitrile (SAN), acrylonitrile butadiene styrene, acrylic/styrene/acrylonitrile block terpolymer (ASA), polysulfone, polyurethane, polyphenylenesulfide, acetal resins, polyamides, polyaramides, polyimides, polyacrylic acid esters, copolymers of ethylene and propylene, copolymers of styrene and butadiene, copolymers of vinylacetate and ethylene, rubber modified polymers, thermoplastic polymer blends, and combinations thereof.

In one exemplary embodiment, the foamable polymer composition is an alkenyl aromatic polymer material. Suitable alkenyl aromatic polymer materials include alkenyl aromatic homopolymers and copolymers of alkenyl aromatic compounds and copolymerizable ethylenically unsaturated co-monomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer.

Examples of alkenyl aromatic polymers include, but are not limited to, those alkenyl aromatic polymers derived from alkenyl aromatic compounds such as styrene, alpha-methylstyrene, ethylstyrene, vinyl benzene, vinyl toluene, chlorostyrene, and bromostyrene. In at least one embodiment, the alkenyl aromatic polymer is polystyrene.

It is to be appreciated that the properties of the extruded foam or foam product may be modified by the selection of the molecular weight of the polymer. For example, the preparation of lower density extruded foam products is facilitated by using lower molecular weight polymers. On the other hand, the preparation of higher density extruded foam products is facilitated by the use of higher molecular weight polymers or higher viscosity resins.

As the polymeric composition advances through the screw extruder 100, the decreasing spacing of the flight 106, defines a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

In some exemplary embodiments, one or more polymer processing aids and/or blowing agents may be provided through the feed hopper 108. In other exemplary embodiments, as the polymer composition advances through the screw extruder 100, one or more ports may be provided through the barrel 102 with associated apparatus 110 configured for injecting one or more polymer processing aids into the polymer composition. Similarly, one or more ports may be provided through the barrel 102 with associated apparatus 112 for injecting one or more blowing agents into the polymer composition.

Exemplary methods according to the invention may utilize one or more of a variety of blowing agents to achieve the desired polymeric foam properties in the final product. According to one aspect of the present invention, the blowing agent composition comprises one or more of $CO_2$ and halogenated blowing agents, such as hydrofluorocarbons (HFCs), hydrochlorofluorocarbons, hydrofluoroethers, hydrofluoroolefins (HFOs), hydrochlorofluoroolefins, hydrobromofluoroolefins, hydrofluoroketones, hydrochloroolefins, and fluoroiodocarbons, alkyl esters, such as methyl formate, water, and mixtures thereof. In other exemplary embodiments, the blowing agent comprises one or more of $CO_2$, HFOs, HFCs, and mixtures thereof.

The blowing agent may be introduced in liquid or gaseous form (e.g., a physical blowing agent) or may be generated in situ while producing the foam (e.g., a chemical blowing agent). For instance, the blowing agent may be formed by decomposition of another constituent during production of the foamed thermoplastic. For example, in the case of a blowing agent that comprises $CO_2$, a carbonate composition or polycarbonic acid may be added to the foamable resin and carbon dioxide will be generated upon heating during the extrusion process. In some exemplary embodiments, $CO_2$ is included as a blowing agent in an amount from about 0.05 to 5.0 weight percent. In other exemplary embodiments, $CO_2$ is included in an amount between about 1.0 and 3.5 weight percent.

The blowing agent may further comprise one or more hydrofluoroolefin blowing agents, such as for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluorobutene-1; 3,4,4,4-tetrafluoro-1-butene; octafluoro-2-pentene (HFO-1438); 1,1,3,3,3-pentafluoro-2-methyl-1-propene; octafluoro-1-butene; 2,3,3,4,4,4-hexafluoro-1-butene; 1,1,1,4,4,4-hexafluoro-2-butene (HFO-1336m/z); 1,2-difluoroethene (HFO-1132); 1,1,1,2,4,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-I-butene; 3,3-difluoro-I-butene; 3,4,4-trifluoro-I-butene; 2,3,3-trifluoro-1-butene; I, 1,3,3-tetrafluoro-I-butene; 1,4,4,4-tetrafluoro-1-butene; 3,3,4,4-tetrafluoro-1-butene; 4,4-difluoro-1-butene; I, I, 1-trifluoro-2-butene; 2,4,4,4-tetrafluoro-1-butene; 1,1,1,2-tetrafluoro-2 butene; 1,1,4,4,4-pentafluorol-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene.

In some exemplary embodiments, the blowing agent may comprise one or more hydrofluorocarbons. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,1-trifluoroethane (HFC-143a), difluoromethane (HFC-32), 1,3,3,3-pentafluoropropane (HFO-1234ze), pentafluoro-ethane (HFC-125), fluoroethane (HFC-161), 1,1,2,2,3,3-hexafluoropropane (HFC 236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245 ea), 1,1,1,2,3 pentafluoropropane (HFC-245 eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof.

In some exemplary embodiments, the HFOs and/or HFCs may be included as a blowing agent in an amount from about 0.05 to 5.0 weight percent. In other exemplary embodiments, the HFOs and/or HFCs is included in an amount between about 2.0 and 4.0 weight percent.

In addition to the blowing agents, one or more processing aids may be added to the polymeric melt to increase the processing window for the polystyrene foam manufacturing. In some exemplary embodiments, the processing aid(s) comprises an organic low molecular weight material, such as, for example a phase changing material. A phase changing material is a material that has a transition temperature from liquid to solid at a particular temperature. The transition temperature of the phase changing material may be varied in a wide temperature range (−40 to 150° C.), depending on the different molecular chain lengths. In some exemplary embodiments, the phase changing material that has a transition temperature from liquid to solid at 24° C. ("PT 24"). The phase changing material may comprise organic phase changing materials, such as, for example, fatty acid esters and wax, or a combination of the two. In some exemplary embodiments, the organic phase changing material comprises between about 16 and 18 carbons, such as an octyl ester of hexadecanoic acid, also known as synthetic beeswax.

The processing aid may be included in any amount to provide the required benefit to the polystyrene foam process. In some exemplary embodiments, the processing aid is included in about 0.05 to about 10.0 weight percent. In other exemplary embodiments, the processing aid is included in an amount from about 0.5 to about 3.0 weight percent.

The fatty acid esters may be pumped directly into an extruder in the liquid form, or alternatively, the fatty acid esters may be microencapsulated into powders and fed directly into a hopper. The material used to microencapsulate the fatty acid esters may comprise one or more polymers, such as, for example, melamine formaldehyde, urea formaldehyde, and acrylate copolymer resins. According to various aspects of the present invention, microencapsulation of the fatty acid esters may reduce the diffusivity of blowing agents by trapping the blowing agent gases inside the microencapsulation shells. Such an encapsulation provides controlled release, wherein the shell may let $CO_2$ diffuse in, but will keep the fatty acid ester from diffusing out of the shell. It is further contemplated that the fatty acid esters be compounded into a carrier material, such as a polystyrene polymer material, and incorporated into the masterbatch pellets for direct delivery into the extruder.

Exemplary phase changing materials may include the materials listed below in Table 1.

TABLE 1

Phase Changing Materials and corresponding phase transition temperatures.

| PCMs | Phase transition temperatures from soilid to liquid (° C.) | Chemical composition |
|---|---|---|
| PT-5 | −5 | Synthetic Beeswax |
| PT24 | 24 | Synthetic Beeswax |
| PT24 microencapsulated powder | 24 | 80% Synthetic Beeswax 20% encapsulated wall material |
| PT33 microencapsulated powder | 33 | 80% Synthetic Beeswax 20% encapsulated wall material |
| PT60 | 60 | Synthetic Beeswax |

Figure 2:
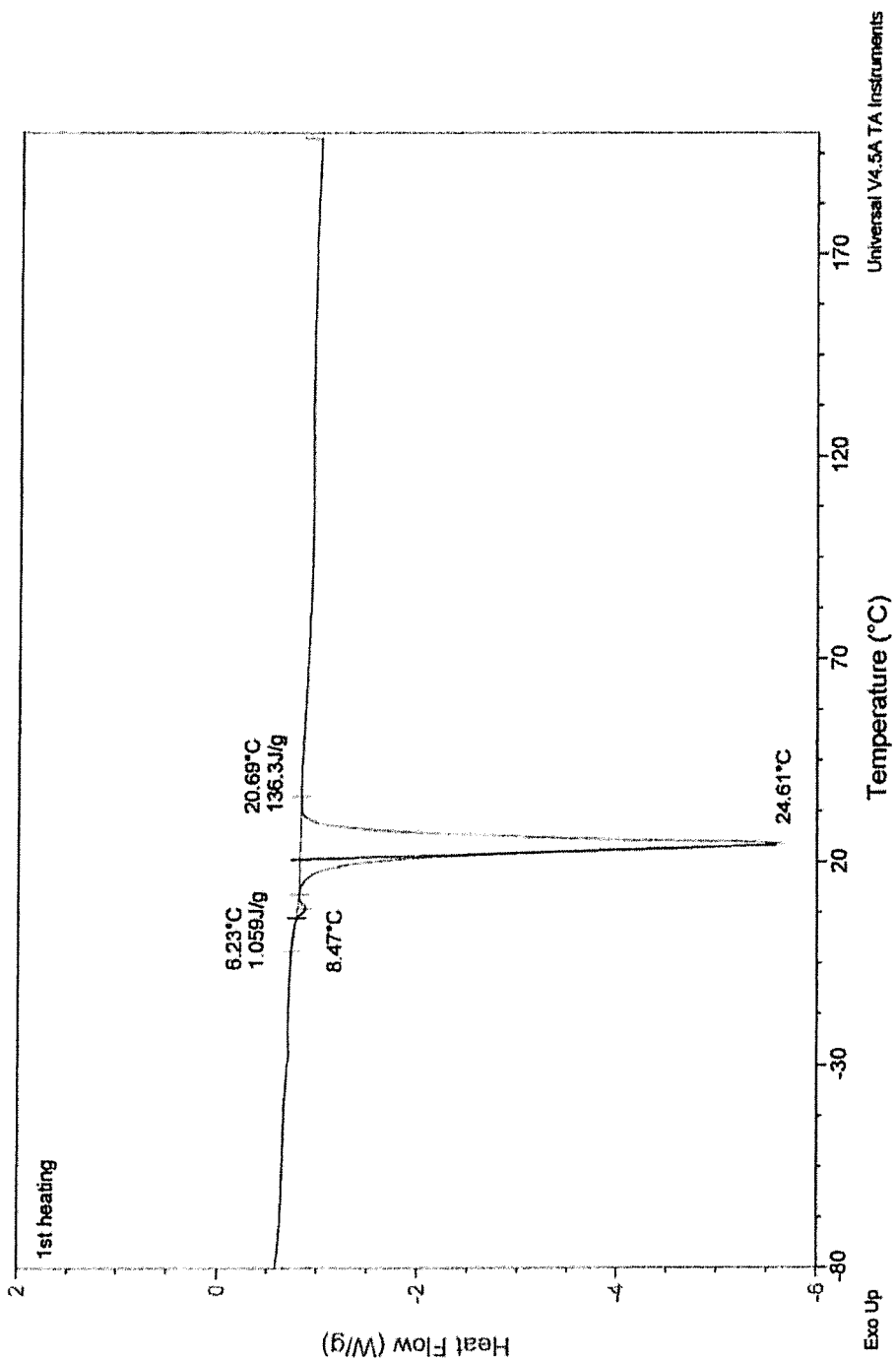
FIG. 2 is a graph depicting a DSC curve of an exemplary phase changing processing aid.

FIG. 2 illustrates a DSC curve of one exemplary phase changing material (PT24), in which the phase transition temperature from solid to liquid is determined as the peak value of 24.61° C.

Inclusion of a fatty acid ester processing aid(s) causes the window available for processing to widen in various ways. For instance, the chemical structure of phase changing materials may make them more compatible with blowing agents and thus increase the solubility of the blowing agents in polystyrene and decrease the diffusivity of the gases out of the polystyrene. Additionally, the low molecular weight of the phase changing materials may plasticize the polystyrene melt and improve the rheological properties for better foaming. The processing window may further be widened due to the release of heat from the phase changing materials by changing from liquid to solid phase during foam board cooling process, which may slow down the melt gelation (board settling) process. By widening the operating window, the foam is able to achieve desirable properties, such as a sufficient R value.

The foamable composition may further contain at least one infrared attenuating agent (IAA) to increase the R-value of the foam product. Blowing agents such as HFCs and HFOs, while environmentally friendly, tend to decrease the R-value of the foam product compared to a conventional HCFC foamed product. It was discovered, however, that the addition of low levels of an infrared attenuating agent to a foamable composition containing such blowing agents may increase the R-value of the foam to an amount at least comparable to, or better than, a foam produced with an HCFC blowing agent. Although the infrared attenuating agent increases the R-value for foams that include HFO and/or HFC blowing agents, the addition of infrared attenuating agents also tends to decrease the cell size of the cells in the foam, which results in undesirable final foamed products. In particular, small cell sizes tend to increase board bulk density, increase product cost, and reduce the process window during the extrusion process. Further, infrared attenuating agents undesirably increase the melt rheology, which will result in an increase of the die pressure.

Non-limiting examples of suitable infrared attenuating agents for use in the present composition include nanographite, carbon black, powdered amorphous carbon, asphalt, granulated asphalt, milled glass, fiber glass strands, mica, black iron oxide, metal flakes (for example, aluminum flakes), carbon nanotube, nanographene platelets, carbon nanofiber, activated carbon, titanium dioxide, and combinations thereof. In exemplary embodiments, the infrared attenuating agent is present in the foam composition in an amount from 0.005% to 5.0% by weight of the total composition. In other embodiments, the infrared attenuating agent may be present in an amount from 0.05 to 3.0% by weight, from 0.05 to 2.0% by weight, or from 0.1 to 1.0% by weight. In some exemplary embodiments, the infrared attenuating agent is present in the composition in an amount less than or equal to 0.5% by weight.

In at least one exemplary embodiment, the infrared attenuating agent is nanographite. The nanographite can be multilayered by furnace high temperature expansion from acid-treated natural graphite or microwave heating expansion from moisture saturated natural graphite. In addition, the nanographite may be a multi-layered nanographite which has at least one dimension with a thickness less than 100 nm. In some exemplary embodiments, the graphite may be mechanically treated such as by air jet milling to pulverize the nanographite particles. The pulverization of the particles ensures that the nanographite flake and other dimensions of the particles are less than 150 microns.

The nanographite may or may not be chemically or surface modified and may be compounded in a polyethylene methyl acrylate copolymer (EMA), which is used both as a medium and a carrier for the nanographite. Other possible carriers for the nanographite include polymer carriers such as, but not limited to, polymethyl methacrylate (PMMA), polystyrene, polyvinyl alcohol (PVOH), and polyvinyl acetate (PVA). In exemplary embodiments, the nanographite is substantially evenly distributed throughout the foam. As used herein, the phrase "substantially evenly distributed" is meant to indicate that the substance (for example, nanographite) is evenly distributed or nearly evenly distributed within the foam.

Further, the inventive composition may contain a fire retarding agent in an amount up to 1.0% by weight. For example, fire retardant chemicals may be added in the extruded foam manufacturing process to impart fire retardant characteristics to the extruded foam products. Non-limiting examples of suitable fire retardant chemicals for use in the inventive composition include brominated aliphatic compounds such as hexabromocyclododecane and pentabromocyclohexane, brominated phenyl ethers, esters of tetrabromophthalic acid, and combinations thereof.

Optional additives such as nucleating agents, plasticizing agents, pigments, elastomers, extrusion aids, antioxidants, fillers, antistatic agents, biocides, and/or UV absorbers may be incorporated into the inventive composition. These optional additives may be included in amounts necessary to obtain desired characteristics of the foamable gel or resultant extruded foam products. The additives may be added to the polymer mixture or they may be incorporated in the polymer mixture before, during, or after the polymerization process used to make the polymer.

Once the polymer processing aid(s), blowing agent(s), and optional additional additives have been introduced into the polymeric material, the resulting mixture is subjected to some additional blending sufficient to distribute each of the additives generally uniformly throughout the polymer composition to obtain an extrusion composition.

This extrusion composition is then forced through an extrusion die 114 and exits the die into a region of reduced pressure (which may be above, or more typically below atmospheric pressure), thereby allowing the blowing agent to expand and produce a polymeric foam layer or slab. The polymeric foam may be subjected to additional processing such as calendaring, water immersion, cooling sprays or other operations to control the thickness and other properties of the resulting polymeric foam product.

The foam composition produces rigid, substantially closed cell, polymer foam boards prepared by an extruding process. Extruded foams have a cellular structure with cells defined by cell membranes and struts. Struts are formed at the intersection of the cell membranes, with the cell membranes covering interconnecting cellular windows between the struts. In the present invention, the inventive composition produces substantially closed cellular foams with an average density of 1.0 lbs/ft$^3$ to 5.0 lbs/ft$^3$, or from 1.3 lbs/ft$^3$-4.0 lbs/ft$^3$. It is to be appreciated that the phrase "substantially closed cell" is meant to indicate that the foam contains all closed cells or nearly all of the cells in the cellular structure are closed. In most exemplary embodiments, not more than 30.0% of the cells are open cells, and particularly, not more than 10.0%, or more than 5.0% are open cells, or otherwise "non-closed" cells. The closed cell structure helps to increase the R-value of a formed, foamed insulation product. It is to be appreciated, however, that it is within the purview of the present invention to produce an open cell structure, although such an open cell structure is not an exemplary embodiment.

Additionally, the inventive foam composition produces extruded foams that have insulation values (R-values) of about 4.0-7.0 per inch. In at least one embodiment, the R-value 5.0 per inch. In addition, the average cell size of the inventive foam and foamed products is 0.005 mm (5 microns) to 0.6 mm (600 microns) and, in some embodiments, from 0.160 mm (160 microns) to 0.200 mm (200 microns). The extruded inventive foam may be formed into an insulation product such as rigid insulation boards, insulation foam, packaging products, and building insulation or underground insulation (for example, highway, airport runway, railway, and underground utility insulation).

The inventive foamable composition additionally may produce extruded foams that have a high compressive strength, which defines the capacity of a foam material to withstand axially directed pushing forces. In at least one exemplary embodiment, the inventive foam compositions have a compressive strength within the desired range for extruded foams, which is between about 6 and 80 psi. In some exemplary embodiments, the inventive foamable composition produces a foam having a compressive strength between 20 and 68 psi.

In accordance with another exemplary aspect, the extruded inventive foams possess a high level of dimensional stability. For example, the change in dimension in any direction is 5% or less. In addition, the foam formed by the inventive composition is desirably monomodal and the cells have a relatively uniform average cell size. As used herein, the average cell size is an average of the cell sizes as determined in the X, Y and Z directions. In particular, the "X" direction is the direction of extrusion, the "Y" direction is the cross machine direction, and the "Z" direction is the thickness. In the present invention, the highest impact in cell enlargement is in the X and Y directions, which is desirable from an orientation and R-value perspective. In addition, further process modifications would permit increasing the Z-orientation to improve mechanical properties while still achieving an acceptable thermal property. The extruded inventive foam can be used to make insulation products such as rigid insulation boards, insulation foam, and packaging products.

have been described above both generically and with regard to various exemplary embodiments. Although the general inventive concepts have been set forth in what is believed to be exemplary illustrative embodiments, a wide variety of alternatives known to those of skill in the art can be selected within the generic disclosure. Additionally, following examples are meant to better illustrate the present invention, but do in no way limit the general inventive concepts of the present invention.

EXAMPLES

The following examples introduce about 0.5~3.0 wt % of phase changing processing aid materials into a polystyrene formulation to facilitate XPS foam board extrusion using a traditional extrusion processing line. The extrusion line had a production rate of 100~160 kg/hr. The blowing agents used in the foam board extrusion process included $CO_2$ and/or HFO-1234ze. The process produced foam boards having a thickness of about 1 inch and a width greater than 20 inches using a foaming die temperature between 110 to 130° C. and a foaming die pressure between 800 to 1100 psi.

Example 1. Operating Window Expansion with Phase Changing Materials in $CO_2$ Foaming One percent of PT24 microencapsulated powder containing 80% phase changing material and 20% encapsulation wall material was applied for XPS foaming using about 3.7-4.3% $CO_2$ blowing agent. A foam board with a 1 inch thickness was produced smoothly and the properties of the resulting foam board are shown as Samples 1 & 2 in Table 2 below. The foam board properties are each within the acceptable range for traditional foam boards. Particularly, the boards have a density between about 1.4 and 3 psi, an R-value of 4-7 per inch. a cell size between about 0.005 and 0.6 mm, a compressive strength between about 6 and 80 psi, and an open cell content of less than 30 percent. On the contrary, without the phase changing material, the process could not be continued under the similar processing conditions due to the overshooting of die pressure (Sample #3). This observation indicates that phase changing materials are necessary to balance the pressure profile in the XPS foaming extrusion line. This makes the phase changing material a necessary processing aid that helps to operate the extrusion at significantly lower pressures.

TABLE 2

Application of PCM (PT microencapsulated powder) for $CO_2$ XPS foaming.

| Sample # | PT24 microencapsulated powder (wt %) | Die pressure (psi) | Foam density (pcf) | R value | Cell size (mm) | Open cell (%) | Compressive strength (psi) |
|---|---|---|---|---|---|---|---|
| 1 | 1 | 1072 | 2.71 | 4.29 | 0.182 | 3.39 | 36.09 |
| 2 | 1 | 1081 | 1.87 | 4.15 | 0.201 | 4.59 | 20.74 |
| 3 | 0 | >1200 | N/A | N/A | N/A | N/A | N/A |

Example 2. Application of PT24 Liquid in $CO_2$ Foaming

A liquid processing aid, PT24, was injected directly into the extruder with 3.5% $CO_2$ as the blowing agent. An XPS foam board with good surface quality was produced without any modification to the traditional foaming conditions. The foam board properties are illustrated below, in Table 3. This further proves the benefit of using the subject phase changing materials as a processing aid when using $CO_2$ as the blowing agent.

TABLE 3

Application of PT24 liquid for $CO_2$ XPS foaming

| Sample # | PT24 liquid (wt %) | Foam density (pcf) | R value | Cell size (mm) | Open cell (%) | Compressive strength (psi) |
|---|---|---|---|---|---|---|
| 4 | 0.8 | 2.81 | 4.41 | 0.16 | 1.99 | 36.6 |
| 5 | 1.2 | 2.77 | 4.39 | 0.17 | 5.94 | 32.6 |
| 6 | 1.6 | 2.78 | 4.41 | 0.17 | 6.31 | 32.8 |

Example 3. Design of Experiment (DOE) of Using PT24 Microencapsulated Powder in $CO_2$ Foaming A Design of Experiment ("DOE") was developed to understand the influence that phase changing processing aids have on foam properties. A DOE is an information gathering exercise where one or more variations are present. The particular DOE designed was based on three key parameters: phase changing material usage level (between 1 and 3 weight %), polystyrene melt flow index, and $CO_2$ concentration. A single DOE having three factors and two levels (low and high) was performed.

Figure 3:
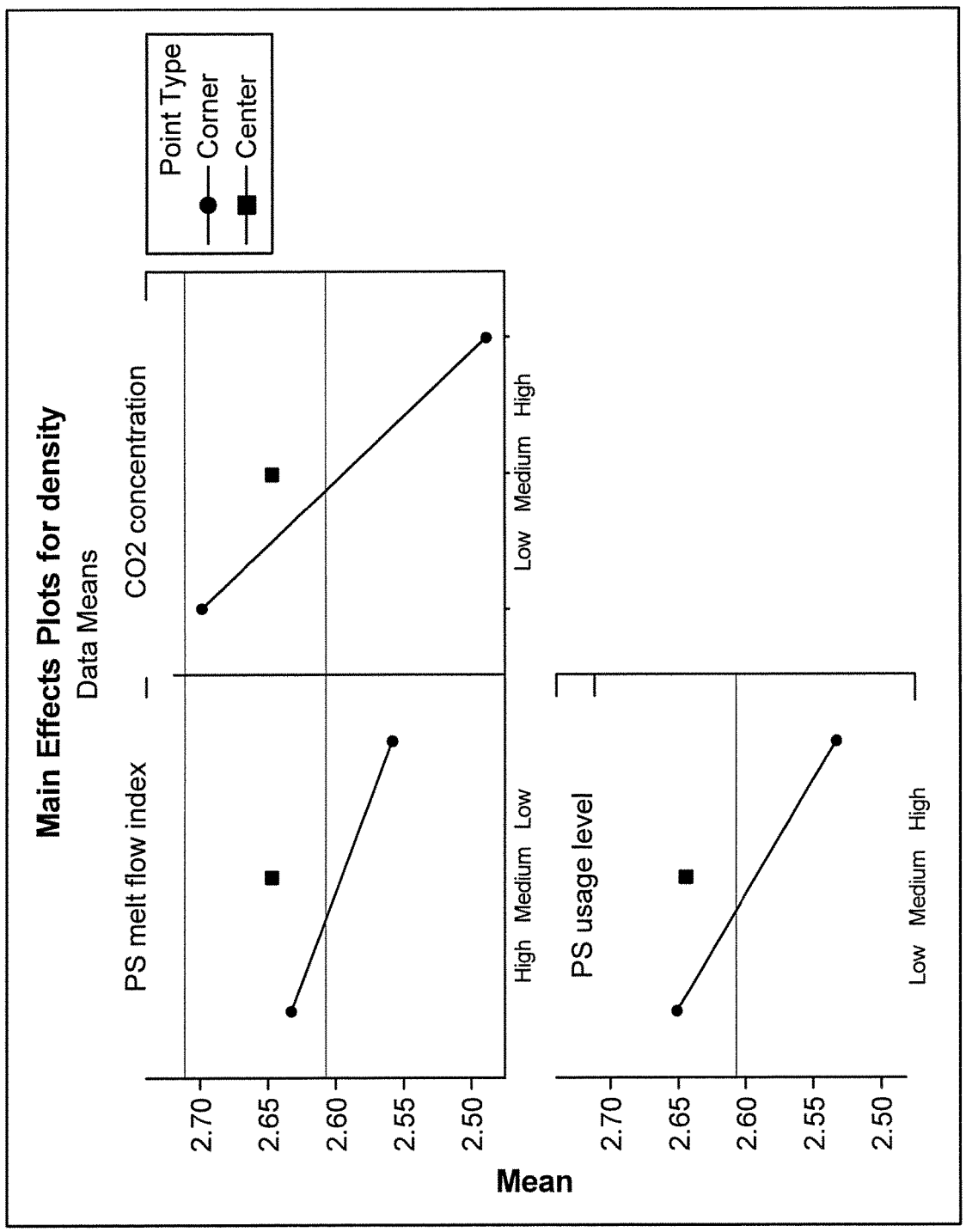
FIG. 3 is a graphical depiction of the main effects from polystyrene melt flow index, $CO_2$ concentration, and phase changing processing aids have on density.
Figure 4:
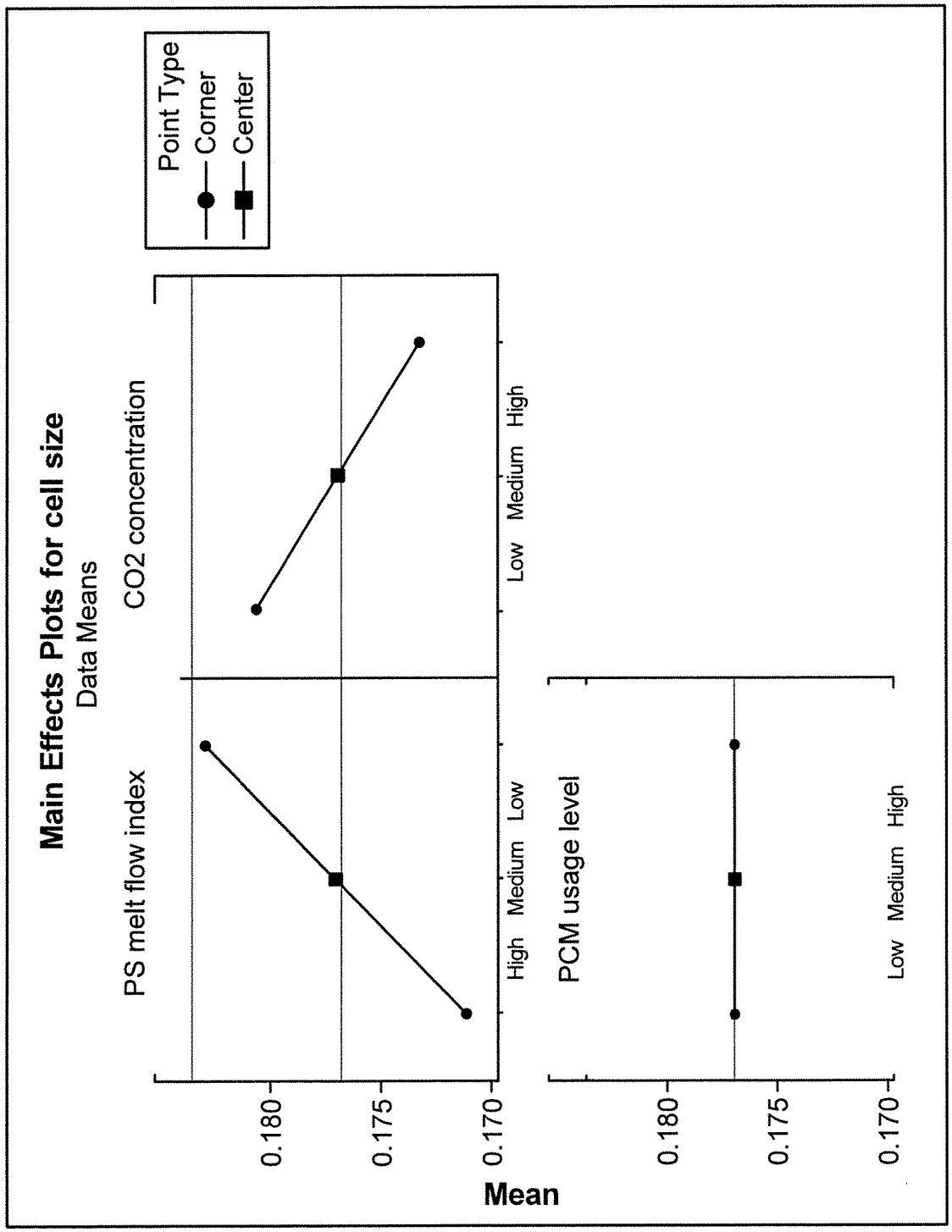
FIG. 4 is a graphical depiction of the main effects from polystyrene melt flow index, $CO_2$ concentration, and phase changing processing aids have on foam cell size.
Figure 5:
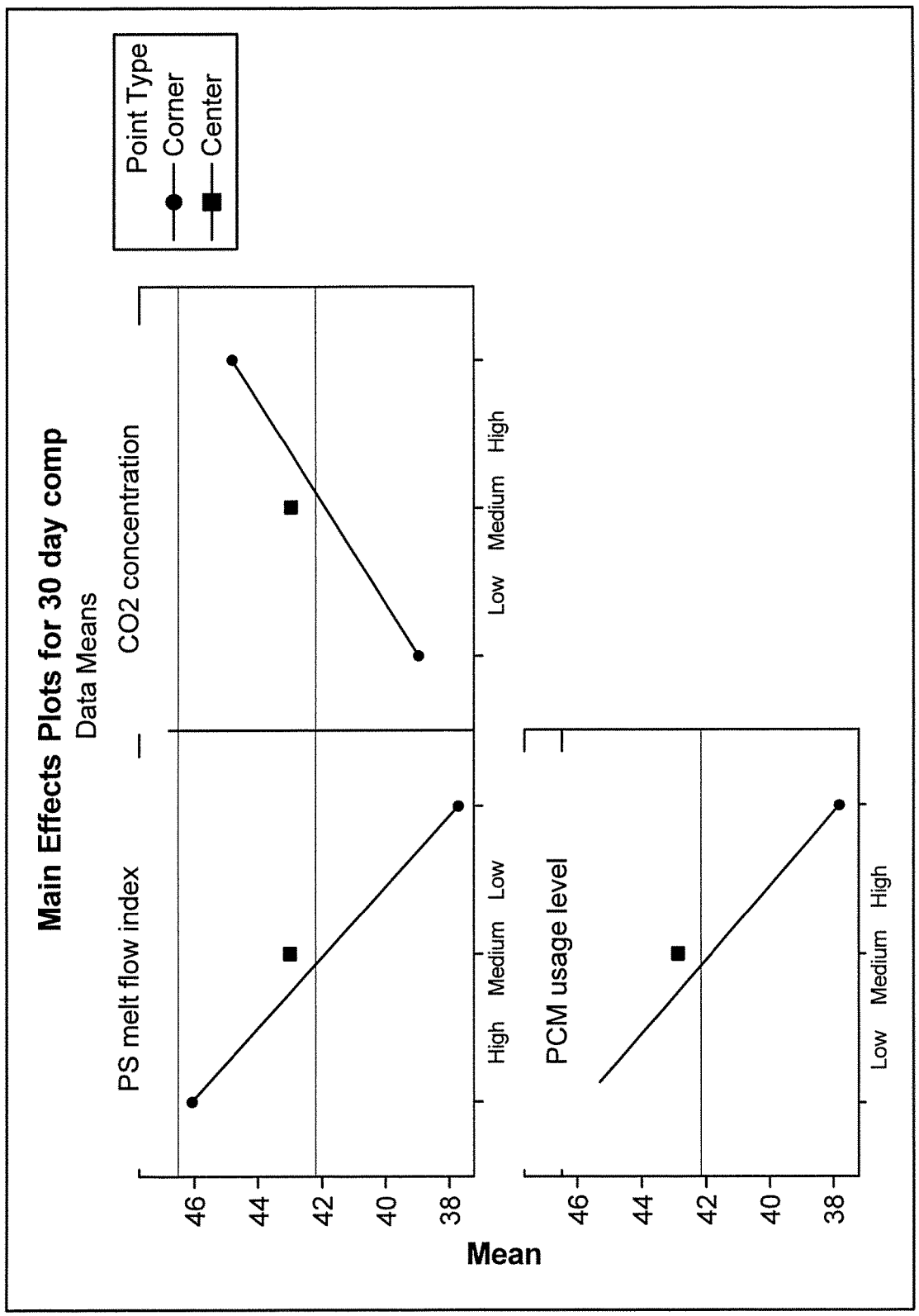
FIG. 5 is a graphical depiction of the main effects from polystyrene melt flow index, $CO_2$ concentration, and phase changing processing aids have on foam compressive strength.

The main effects from the three key parameters to foam density, foam cell size, and compressive strength are summarized in FIGS. 3, 4, & 5, respectively. FIG. 3 illustrates the effects the various parameters have on foam density when exposed to both low and high levels. For instance, at a high polystyrene melt flow index, the foam density is also high. Conversely, as the $CO_2$ or phase changing material concentration increases, the foam density decreases. FIG. 4 illustrates the effects the various parameters have on cell size. Based on the DOE results, it appears that increasing the polystyrene melt flow also increases the foam cell size; however, as was the case with density, increasing the $CO_2$ concentration lowers the cell size of the foam. The amount of phase changing material does not seem to affect the foam cell size. With regard to compression, FIG. 5 illustrates that a decreased polystyrene melt flow index appears to also lower the foam compressive strength, while increasing the amount of phase changing material also lowers the foam compressive strength. However, increasing the $CO_2$ concentration seems to also increase the compressive strength.

Example 4: Application of PT24 Microencapsulated Powder on HFO-1234ze Foaming

Phase changing materials were shown to be good processing aids when using HFO and $CO_2$ as the blowing agents. Table 4, below, summarizes the manufactured foam board properties. Different levels of HFO-1234ze were combined with different levels of $CO_2$. As a processing aid, 1.0 wt % PT24 microencapsulated powder was included. Although the cell size is on the low end of traditional XPS foams, other properties are well within the acceptable range. Additionally, the process is more stable than without phase changing materials as a processing aid.

TABLE 4

Application of PT24 microencapsulated powder for HFO/$CO_2$ XPS foaming.

| Sample # | PT24 microencapsulated powder (wt %) | HFO-1234ze (wt %) | CO2 (wt %) | Foam density (pcf) | R value | Cell size (mm) | Open cell (%) | Compressive strength (psi) |
|---|---|---|---|---|---|---|---|---|
| 7 | 1 | 2.5 | 3.0 | 2.90 | 4.74 | 0.10 | 1.25 | 71.3 |
| 8 | 1 | 2.5 | 3.0 | 2.94 | 4.72 | 0.10 | 1.34 | 77.4 |
| 9 | 1 | 2.5 | 2.7 | 2.85 | 4.74 | 0.10 | 1.98 | 63.0 |
| 10 | 1 | 4.0 | 2.1 | 2.94 | 4.88 | 0.09 | 0.33 | 70.5 |
| 11 | 1 | 4.0 | 2.1 | 2.85 | 4.81 | 0.09 | 1.79 | 75.7 |
| 12 | 1 | 4.0 | 1.0 | 3.36 | 4.93 | 0.13 | 1.71 | 67.9 |

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A foamed insulation product comprising:
a polymeric foam composition comprising:
   polystyrene;
   a blowing agent composition comprising carbon dioxide and at least one of hydrofluoroolefins and hydrofluorocarbons, and
   from 0.05 to 3 wt. % of an organic phase changing material, based upon the weight of the polymeric foam composition, wherein the organic phase changing material has a transition temperature from liquid to solid at a temperature from −5 to 60° C., wherein the organic phase changing material comprises synthetic beeswax;
   wherein the foamed insulation product has an insulation R-value per inch of between 4 and 7.

2. The foamed insulation product of claim 1, wherein the organic phase changing material is microencapsulated.

3. The foamed insulation product of claim 2, wherein the organic phase changing material is microencapsulated by a polymer material comprising one or more of melamine formaldehyde, urea formaldehyde, and acrylate copolymer resins.

4. The foamed insulation product of claim 1, further comprising at least one infrared attenuating agent.

5. The foamed insulation product of claim 1, wherein the foamed insulation product is monomodal.

6. The foamed insulation product of claim 1, wherein the foamed insulation product has a density of from 1 to 5 lbs/ft$^3$.

7. The foamed insulation product of claim 1, wherein the foamed insulation product has a compressive strength between 6 and 80 psi.

* * * * *